United States Patent [19]

Aschberger et al.

[11] 4,242,116
[45] Dec. 30, 1980

[54] MAGNETIC VALVE, ESPECIALLY THREE-WAY VALVE AS A SWITCHING DEVICE FOR MULTI-TEMPERATURE COOLING APPARATUS WITH ONLY ONE REFRIGERATION MACHINE

[75] Inventors: Matthias Aschberger; Dieter Link, both of Giengen, Fed. Rep. of Germany

[73] Assignee: Bosch-Siemens Hausgerate GmbH, Stuttgart, Fed. Rep. of Germany

[21] Appl. No.: 906,632

[22] Filed: May 16, 1978

[30] Foreign Application Priority Data

May 24, 1977 [DE] Fed. Rep. of Germany ........ 2723365

[51] Int. Cl.³ .................................................. F25B 5/00
[52] U.S. Cl. ......................................... 62/199; 62/504; 62/525; 137/625.65; 137/625.5; 251/139
[58] Field of Search .................... 137/627.65, 625.5; 251/77, 139; 62/199, 504, 525

[56] References Cited

U.S. PATENT DOCUMENTS

| | | | |
|---|---|---|---|
| 1,622,069 | 3/1927 | Thomson et al. | 251/77 |
| 2,133,949 | 10/1938 | Buchanan | 62/199 |
| 2,267,515 | 12/1941 | Willcox et al. | 251/139 |
| 2,515,029 | 7/1950 | Almond et al. | 137/625.65 |
| 2,829,837 | 4/1958 | Willcox | 251/77 |
| 2,830,743 | 4/1958 | Rimsha et al. | 251/139 |
| 3,043,336 | 7/1962 | Parent et al. | 251/139 |
| 3,415,487 | 12/1968 | Robarge | 251/139 |
| 3,601,149 | 8/1971 | Gilmore | 137/625.65 |
| 3,779,031 | 12/1973 | Akiyama et al. | 62/199 |

FOREIGN PATENT DOCUMENTS

2257213 7/1974 Fed. Rep. of Germany ...... 137/625.65

Primary Examiner—Ronald C. Capossela
Attorney, Agent, or Firm—Herbert L. Lerner

[57] ABSTRACT

A three-way magnetic valve as a switching device for refrigerators with two different temperature compartments operated with only one refrigeration machine, has an axial bore hole in a tubular housing with an inlet to the bore hole of the housing and an outlet at each end of the housing, a rod-like plunger with a sealing member at end, axially movable in the bore hole so as to seal one end and open the other end and vice versa, a coil of an electro-magnet mounted on the housing, an armature axially movable in the housing to engage and move, when energized, the plunger against the restoring force of a spring. A damping spring is also provided. The valve is simple in design, less expensive, smaller in dimensions, and is substantially trouble-free for long periods of time.

14 Claims, 6 Drawing Figures

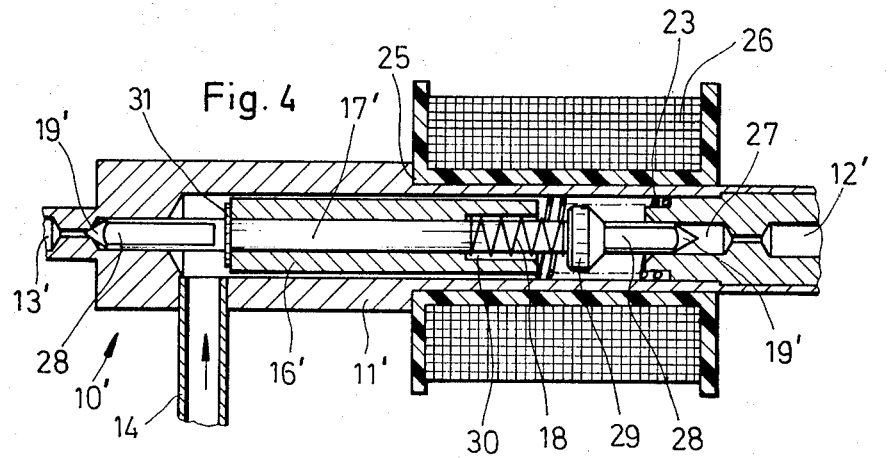
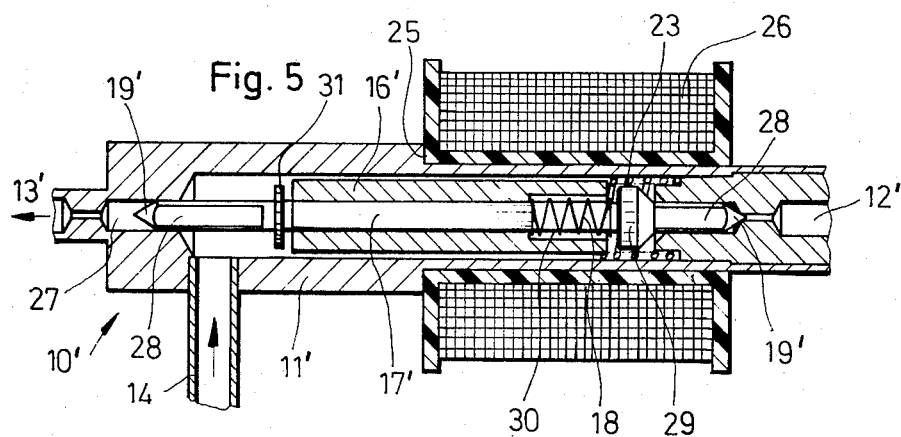
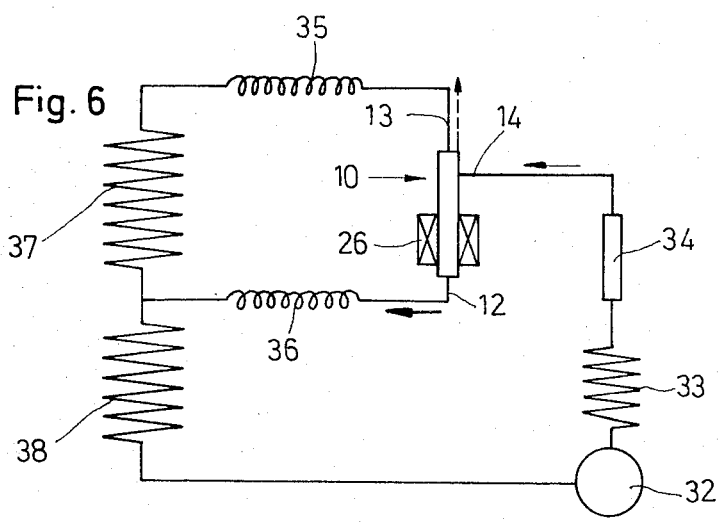

MAGNETIC VALVE, ESPECIALLY THREE-WAY VALVE AS A SWITCHING DEVICE FOR MULTI-TEMPERATURE COOLING APPARATUS WITH ONLY ONE REFRIGERATION MACHINE

BACKGROUND OF THE INVENTION

1. Field of the Invention

This invention relates to a magnetic valve, and more particularly refers to a new and improved three-way valve as a switching device for a multi-temperature cooling apparatus operated with only one refrigeration machine, with a tubular valve housing which has at least one inlet as well as several outlets and on which the coil of an electromagnet is mounted, when energized, acts on the armature which is axially movable in the housing.

2. Description of the Prior Art

In one known magnetic valve of the type mentioned, plugs made of elastic plastic material and disposed in metallic bushings are used as sealing organs. These bushings in turn are movably arranged in sleeves which are in turn supported, axially movably, in a tubular armature. The plugs and the sleeves are guided in the armature by radial securing pins, the ends of which engage in elongated holes in the wall of the armature. In this manner, the plugs and the sleeves have freedom of movement in the axial direction limited to the lengthwise dimension of the elongated holes. Between the sleeves and the bushings for the plugs, a system of three different coil springs are arranged, which are braced alternately against the bushings and the sleeves or, via these and the securing pins, against the armature. These three coil springs are supposed to match the restoring force of the armature to the magnet characteristic of the magnetic valve.

Because of its many parts, the design of the known magnetic valve is complicated and therefore expensive. In addition, its dimensions are relatively large and because of the system used therein with many moving parts and different compression springs, it is also particularly trouble-prone. The known magnetic valve furthermore requires considerable effort to assemble. The known magnetic valve is therefore expensive and has inherent risks, which makes it only conditionally useful as a switching device for the refrigeration machine in multi-temperature cooling apparatus if only because of the long guarantee periods customary in the industry.

SUMMARY OF THE INVENTION

An object of the invention is to provide a magnetic valve, especially a three-way valve which has small dimensions and a simple, uncomplicated design and specifically meets the stricter requirements as a switching device for a multi-temperature cooling apparatus operated with only one refrigeration machine.

With the foregoing and other objects in view, there is provided in accordance with the invention, a magnetic valve, especially a three-way valve as a switching device for multi-temperature cooling apparatus operated with only one refrigeration machine comprising:

(a) a tubular valve housing
(b) an axial bore hole in the tubular valve housing
(c) an inlet in the tubular housing for the introduction of fluid to the axial bore hole
(d) an opening at each end of the tubular valve housing for the discharge of fluid from the axial bore hole
(e) a rod-like plunger axially movable in the bore hole of the tubular valve housing
(f) a sealing member at each end of the rod-like plunger with axial movement of the plunger in one direction causing closing of one opening at one end of the tubular valve housing by the sealing member at the end of the plunger and with axial movement of the plunger in the opposite direction causing opening of the closed opening and closing of the other opening at the opposite end of the housing by the other sealing member at the opposite end of the plunger
(g) a coil of an electromagnet mounted on the tubular valve housing
(h) an armature axially movable in the housing and when activated by energizing the coil of the electromagnet engages and moves the plunger and attached sealing members against a restoring force, and
(i) a spring in the housing in engagement with the plunger-sealing members to provide the restoring force.

Other features which are considered as characteristic for the invention are set forth in the appended claims.

Although the invention is illustrated and described herein as embodied in magnetic valve, especially three-way valve as a switching device for multitemperature cooling apparatus with only one refrigeration machine, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 4 is a second embodiment example specifically suited for a-c operation of a three-way magnetic valve, likewise in the rest position, FIG. 5 is the three-way magnetic valve in the energized state, and FIG. 6 is a simplified circuit diagram, showing the incorporation of the three-way magnetic valve in the cooling circuit of a two-temperature refrigerator.

DETAILED DESCRIPTION OF THE INVENTION

Figure 1:
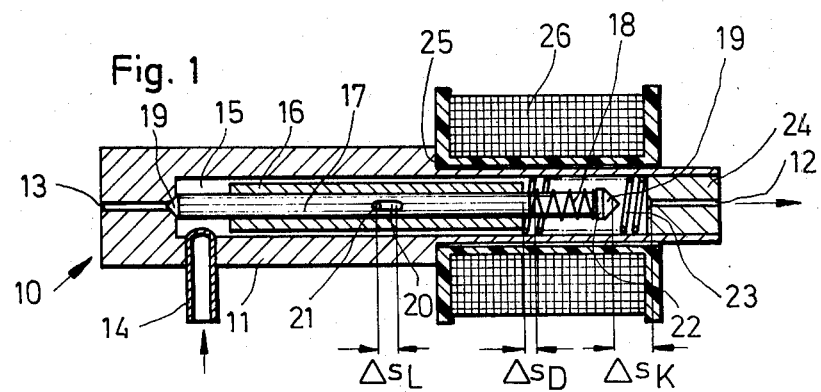
FIG. 1 shows a three-way magnetic valve in the rest position, with outlets which are located at the ends of its housing and can be controlled by a valve plunger which is moved along by the armature and is displaceable relative thereto under the action of a coil spring.

The sealing organs are disposed at opposite ends of a rod-like plunger which protrudes from the armature on both sides in the axial direction and is able to execute a limited motion relative to the former against the restoring force of a power accumulator, for instance, a damping spring.

By arranging the sealing organs at opposite ends of a rod-like plunger, the parts required for the manufacture of such a magnetic valve can be reduced to a minimum. Thereby, the magnetic valve according to the invention can be produced cost-effectively with only small dimensions and simple design in a simple manner. It is therefore particularly well suited to work in a refrigeration machine over long periods of time under the predetermined operating conditions.

In a preferred design of the invention, the plunger is equipped at each of its ends protruding from the armature with a sealing cone. These cones, together with the valve seats arranged at the outlets of the valve housing form needle valves.

Such needle valves not only can be produced simply and reliably, but they also have only small leakage losses and therefore are particularly well suited for securely shutting of a line branch, as is required of the switching devices for multi-temperature cooling apparatus operated by only one refrigeration machine.

Extremely few parts are required for the manufacture of such a magnetic valve if, according to an additional advantageous embodiment of the invention the plunger and the sealing cone are made of plastic as an integral part.

Thus, not only can the manufacture of the valve be simplified and cheapened very considerably thereby, but its dimensions can also be reduced substantially so that it is suitable especially for use under restricted space conditions, such as is the case in switching device for a two-temperature refrigerator.

In one preferred design according to the invention, the plunger is axially guided in the valve housing at its ends and in turn serves as a guide for the armature.

With appropriate design of the armature, under no circumstances does the armature come into contact with the wall of the tubular valve housing. In this manner, in the case of an a-c operated electromagnet, noise generated if the oscillating armature hits the wall of the valve housing, is reliably prevented.

In order to ensure that the armature takes the plunger along upon switching-on, the relative motion between the plunger and the armature is limited by stop means. This can be accomplished either by making the stop means an elongated hole arranged in the plunger, into which a driving pin placed in the armature engages, or making the stop means a securing ring mounted on the plunger, against which the plunger can rest with its one end face. Use of the second alternative is preferred because it is easier to assemble.

An important feature is to make the damping spring in the form of a compression spring which sits on that section of the plunger which is associated with the outlet open in the rest condition. In the rest condition one side of the spring is braced against the end face of the armature and the other side of the spring is braced against a shoulder arranged at this section of the plunger.

With this arrangement of the damping spring according to the invention, a particularly simple, space-saving and reliable design is obtained.

To ensure also in an a-c field secure sealing of the outlet which is closed in the energized state of the electromagnet, the forces acting on the armature when the electromagent is energized (by alternating current) are at equilibrium at that point where the armature has travelled the total distance of the plunger plus approximately half the free travel distance, limited by the stop, of the armature which is displaced relative to the plunger against the force of the damping spring.

In this manner it will be accomplished that the armature can freely oscillate back and forth in the a-c field between the stops at the plunger. In this manner the otherwise existing danger of hitting of the armature at the plunger which can cause noise and wear or leaks is avoided.

Further advantageous features will be explained in the following description with the aid of two different embodiment examples, shown simplified in the drawings, of a three-way magnetic valve which can be used as a switching device for a two-temperature refrigerator operated with only one refrigeration machine. As is common in the art, the three-way magnetic valve is controlled by the evaporator temperature. The use of temperature to control a magnetic valve in a refrigerator is shown in U.S. Pat. No. 2,133,949, particularly FIGS. 6–8, in which the switching function for the switches which trigger the three-way valves by thermostats $T_1$ and $T_2$ are shown.

Figure 2:
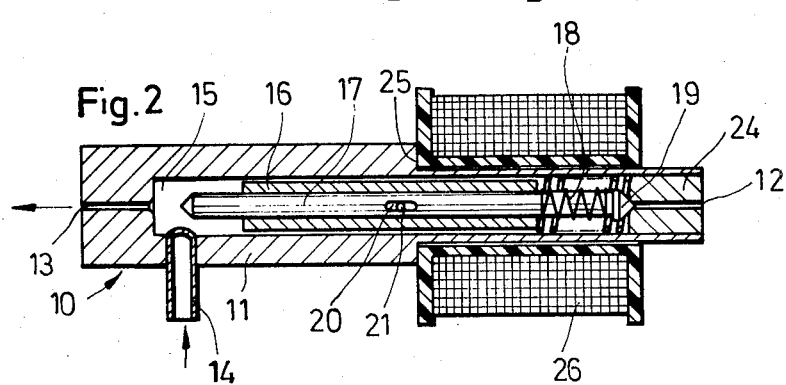
FIG. 2 shows a three-way magnetic valve in the energized state.

A three-way magnetic valve 10 shown as a first embodiment example in FIGS. 1 and 2 comprises a tubular valve housing 11 with outlets 12 and 13 located at opposite ends of the latter. Near that end section of the tubular valve housing, which is associated with the outlet 13 which is closed in the rest condition, a tube 14, serving as the inlet, is radially introduced from the side. In the interior of the valve housing 11 there is an axial bore hole 15 which is in communication with the inlet 14 and the outlets 12 and 13. Within this bore hole 15 is also arranged an armature 16 which has the form of a hollow cylinder and is movable in the axial direction.

A rod-like plunger 17 to serve as the sealing member for the outlets 12 and 13 is arranged in the interior of the hollow cylindrical armature 16. The ends of plunger 17 protrude on both sides from the armature 16 in the axial direction. The plunger 17 is able to execute to the armature 16 a limited relative motion against the restoring force of a damping spring 18. The plunger 17 is equipped at its ends protruding from the armature 16 with one sealing cone 19 at each end. The sealing cones 19 together with valve seats arranged at the outlets 12 and 13 of the valve housing 11 form needle valves. In the embodiment example shown, the plunger 17 is integral with the sealing cones 19 and the unitary plunger 17 and sealing cones 19 are formed of plastic. In about the middle of the plunger 17, there is an elongated hole 20 which goes through the plunger 17 in the radial direction and extends lengthwise in the axial direction. A driving pin 21 seated in the armature enters the elongated hole 20 engaging the plunger 17 and this combination serves as a stop means and thus limits the relative motion between the plunger 17 and the armature 16 to the dimension of the elongated hole 20 ($\Delta s_L$, FIG. 1).

The damping spring 18, acting as a compression spring, is designed in the form of a coil spring which sits with its turns loosely on that section of the plunger 17 which is associated with the outlet 12, which latter is open in the rest condition of the three-way magnetic valve 10. If the spring 18 is cocked, it is braced on the one side against the end face of the armature 16 which is associated with the outlet 12 and on the other side, against a shoulder 22 formed at this section of the plunger 17 by the base of the sealing cone 19.

One end of the closing spring 23 is braced against the end face of the armature 16 facing the outlet 12. The closing spring 23 is also designed in the form of a compression coil spring. In contrast to the damping spring 18, this closing spring 23 is pretensioned in the rest position. The other end of closing spring 23 rests against a plug 24 which is inserted into the end section associated with the outlet 12 of the tubular valve housing 11 and comprises the outlet 12 with the valve seat of the latter.

The end section of the valve housing 11 associated with the outlet 12 is equipped with a step-like shoulder 25, on which a coil 26 is mounted for switching the three-way magnetic valve 10.

In the released condition, the damping spring 18 is shorter by the dimension $\Delta s_D$ (FIG. 1) than the distance between the shoulder 22 of the plunger 17 serving here as the abutment on the one side, and the end face of the armature 16, on the other side, which is displaced under the action of the closing spring 23 into the end position corresponding to the rest condition. In the rest condition, the sealing cone 19 corresponding to the outlet 13 is seated on its valve seat. In that condition, it is acted upon by the pre-tension of the closing spring 23, the force of which is transmitted to the plunger 17 and thereby, to the sealing cone 19 via the stop 21 of the armature 16, which stop 21 rests against the left end of the elongated hole 20 in the plunger 17.

Figure 3:
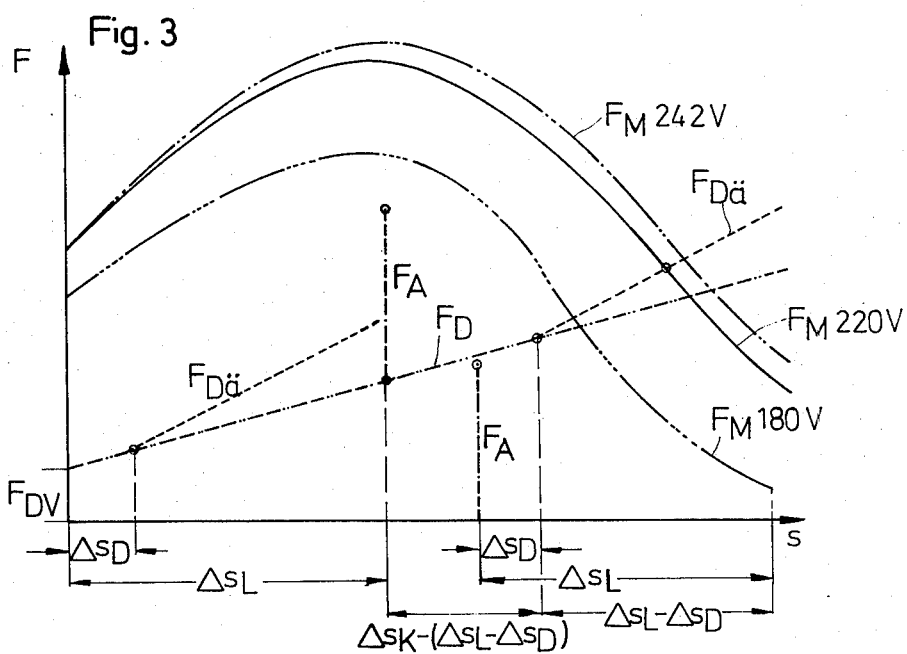
FIG. 3 is a diagram illustrating the forces acting on the plunger when the magnet is energized.

In the diagram shown in FIG. 3, the forces acting on the moving system of the three-way magnetic valve 10 are plotted versus travel distance. The arc-like curves represent the forces exerted by the electromagnet on the armature 16 in a tolerance field of 187 V to 242 V of an a-c power line, while the sloping straight lines represent the forces exerted by the springs, and the vertical straight lines the forces which become effective when the magnet valve is switched into a refrigerant loop; they become effective on the plunger because of pressure differences between the open and the closed outlet. The interaction of the forces effective in the three-way magnetic valve 10 will be explained later in connection with the description of the latter's operation.

The second embodiment example of a three-way electromagnetic valve 10' shown in FIGS. 4 and 5 differs primarily from the embodiment example according to FIGS. 1 and 2 in that here, the plunger 17' is guided axially movably at its ends in the valve housing 11' and in turn serves as a guide for the armature 16'. To this end, at the valve seats of the outlets 12' and 13', holes 27 are provided which receive the ends of the plunger 17' having the sealing cones 19'. With the guidance of the plunger 17' in the valve housing 11' produced in this manner, the passage of the magnetic valve is ensured by lateral flats 28 at each end of the plunger 17'. In this case, the damping spring 18, which is designed as a compression coil spring with the same characteristics as detailed in the example described earlier, is braced against a shoulder 29 arranged on the plunger 17'. The other end of the damping spring 18, which in this embodiment example is predominantly contained in a bore 30 of the armature 16', however, is braced against a step in the bore 30. The stop means for the armature 16' in this case are a securing ring 31 placed near the end of the plunger 17' facing the outlet 13' on the one side and the shoulder 29 at the plunger 17' on the other side.

The circuit diagram shown in simplified form in FIG. 6 depicts a conventional, compressor-operated cooling circuit of a two-temperature refrigerator. It consists substantially of an encapsulated motor-compressor unit 32, a condenser 33, a drier 34 and two parallel-connected choke capillaries 35, 36 as well as the evaporators 37 and 38 with the corresponding connecting lines. In this circuit, the evaporator 37 is associated with the normal cooling compartment, while the evaporator 38 cools the freezer. Into this circuit, the three-way valve 10 or 10' is inserted in such a way that it lets liquid refrigerant flow, in the rest condition, via the choke capillary 36 into the evaporator 38 associated with the deep-cooling compartment, while with the magnetic valve energized, it flows via the choke capillary 35 first into the evaporator 37 associated with the normal cooling compartment and from there into the evaporator 38. The two evaporators 37 and 38 are connected in series, so that both of them are supplied with liquid refrigerant from the condenser 33 and both cool simultaneously as long as liquid refrigerant still gets into the following evaporator 38.

As can be seen particularly from the diagram according to FIG. 3, only the pre-tension force $F_{DV}$ of the closing spring 23 at first acts on the plunger 17 via the armature 16 and the stop 21 which, if the coil is not energized is displaced entirely to the left in the elongated hole 20. This presses the sealing cone 19 with the pre-tension force $F_{DV}$ of the closing spring 23 on its valve seat, so that the outlet 13 is closed. In this position, the outlet 12, which is associated with the opposite end of the three-way magnetic valve 10, is open. If a three-way valve is used in the cooling circuit of a two-temperature refrigerator, the liquid refrigerant, supplied via the tube 14 from the condenser 33, flows through the bore hole 15 in the valve housing 11 and the outlet 12 to the choke capillary 36 and from there into the evaporator 38 of the deep-cooling compartment.

In this case, a substantially lower evaporation pressure prevails behind the closed outlet 13, so that the valve plunger 17 is additionally pressed against the seat of the outlet 13 with a force $F_A$. This force $F_A$ corresponds to the product of the pressure difference between the two outlets 12 and 13 and the cross section area of the outlet 13. The total closing force, with which the plunger 17 with its sealing cone 19 is pressed against the seat of the outlet 13, is therefore $F_{DV}+F_A$.

If now the coil 26 is energized by closing the electric circuit, the armature 16 is at first acted upon only by the magnetic force $F_M$, which is a function of the distance s, as is seen from FIG. 3. The closing spring 23 with its force $F_D$ and the spring constant $C_D$ acts on the armature 16 as the counterforce.

Under the influence of the larger magnetic force, the armature 16 now moves toward the end on the coil side of the three-way magnetic valve 10 until it begins, after having travelled the distance $\Delta s_D$, to cock the damping spring 18. Therefore, the force $F_{Da}$ of the damping spring 18 is superposed on the force $F_D$ of the closing spring 23, so that the total counterforce is composed of the forces $F_D+F_{Da}$. Under the influence of the larger magnetic force, the armature 16 continues to move to the right until the stop 21, which is firmly connected to the armature 16, hits the opposite end of the elongated hole 20 in the plunger. Then the armature 16 has travelled the distance $\Delta s_L$ corresponding to the length dimension of the elongated hole 20. The force $F_A$ stemming from the pressure difference is now added as the counterforce. As the force exerted by the magnetic field on the armature is larger at this point than the sum total of the forces $F_D$, $F_{Da}$ and $F_A$, the armature 16 pulls the plunger 17 with its sealing cone 19 away from the valve seat at the outlet 13 via the stop 21. Therefore, the outlet 13 opens, whereupon the damping spring 18 can expand again. The armature 16 now moves, together with the plunger 17, in the direction toward the outlet 13, and as the damping spring expands, the plunger moves toward the valve seat of the outlet 12 by the difference between $\Delta s_L$ and $\Delta s_D$. After the armature 16 has moved to the right by the distance $\Delta s_K - (\Delta s_L - \Delta s_D)$, the sealing cone 19 closes the outlet 12. On its further travel to the right, there is again a relative motion between the armature 16 and the plunger 17, whereby the damping spring 18 is tensioned again.

This damping spring is set so that under the influence of the magnetic field and the force of the closing spring 23 and the damping sping 18 which counteract the former, the armature moves to the right only so far that equilibrium comes about at that instant when the stop 21 is in the center of the elongated hole 20 of the plunger 17. This means that the armature can oscillate freely in the region of the elongated hole 20, if the coil 26 is energized by a-c current; thereby permitting movement in the elongated hole 20 without touching the ends of the elongated hole 20. In this manner, the oscillations of the armature are prevented from being transmitted to the plunger 17 and undesired noise and likewise, nonuniform and insufficient closing force as well as wear at the closing cone are avoided.

As long as the electromagnet is energized, the armature remains in this equilibrium position. Only when the magnetic field breaks down after the excitation current is switched off is the armature 16 urged again into its rest position under the action of the closing spring 23.

In the embodiment examples depicted and described, the outlets 12 and 13 as well as 12' and 13' are connected to the choke capillaries 35 and 36. Thereby, the dimensions of the three-way magnetic valve 10 can be kept particularly small.

In the embodiment example according to FIGS. 1 and 2, the armature 16 is guided in the bore hole 15. The cross section area of the armature 16 relative to the wall of the hole 15 is made so that enough space is available through which liquid refrigerant can flow. The armature is advantageously provided with a coating of plastic, in order to keep the wear of the armature low, which occurs through friction at the wall of the bore hole 15, after many switching cycles.

In the embodiment example according to FIGS. 4 and 5, the differences between the length of the armature 16' on the one hand and the distance of the securing ring 31 from the end face of the shoulder 29, on the other hand, corresponds to the clearance in the elongated hole 20 as shown in the embodiment example of FIGS. 1 and 2. The substantial difference from that embodiment example of FIGS. 1 and 2 is, however, that in the example of FIGS. 3 and 4 the armature is not guided in the bore hole 15 but on the plunger 17' which in turn is guided in holes 27. If the dimension of the diameter of the armature 16' is designed appropriately, the armature 16' will not hit the wall of the bore 15 in the event of oscillations occurring in the a-c field and, of course, undesirable noise is thereby avoided.

There is claimed:

1. Magnetic valve, especially three-way valve as a switching device for multi-temperature cooling apparatus operated with only one refrigeration machine, comprising:
   (a) a tubular valve housing
   (b) an axial bore hole in said tubular valve housing
   (c) an inlet in said tubular housing for the introduction of fluid to said axial bore hole
   (d) an opening at each end of the tubular valve housing for the discharge of fluid from said axial bore hole
   (e) a single rod-like plunger axially movable in the bore hole of said tubular valve housing
   (f) a sealing member at each end of the single rod-like plunger with axial movement of the plunger in one direction causing closing of one said opening at one end of the tubular valve housing by the sealing member at the end of the plunger, and with axial movement of the plunger in the opposite direction causing opening of said closed opening and closing of the other opening at the opposite end of the housing by the other sealing member at the opposite end of the plunger
   (g) a coil of an electromagnet mounted on the tubular valve housing
   (h) an armature axially movable in the housing which when activated by energizing said coil of the electromagnet engages and moves said plunger and attached sealing members against a restoring force and
   (i) a spring in said housing in engagement with said plunger-sealing members to provide said restoring force.

2. Magnetic valve according to claim 1, wherein the sealing member at each end of the rod-like plunger is in the form of a sealing cone which, together with valve seats arranged at the openings at each end of the tubular valve housing, form needle valves.

3. Magnetic valves according to claim 2, wherein the rod-like plunger and the sealing cones are made of plastic as an integral part.

4. Magnetic valve according to claim 1, wherein the valve housing has holes at each end which receive the ends of the plunger and guides the plunger at its ends as it moves axially in the valve housing and in turn serves as the guide for the armature.

5. Magnetic valve according to claim 4, wherein the relative motion between the plunger and the armature is limited by means of a stop.

6. Magnetic valve according to claim 5, wherein the stop means is an elongated hole in the plunger into which hole is inserted a driving pin attached to the armature with the length of the elongated hole determining the relative motion between the plunger and the armature.

7. Magnetic valve according to claim 5, wherein the stop means is a securing ring mounted on the plunger with axial movement of the armature stopped by the securing ring and the relative motion between the plunger and the armature determined by the distance between the end face of the armature and the securing ring.

8. Magnetic valve according to claim 5, wherein a damping spring in the form of a compression spring is mounted on that section of the plunger which is associated with the outlet at one end of the tubular valve housing open in the rest condition, with the spring braced on the one side against the end face of the armature nearest this outlet, and the other side of the spring braced against a shoulder of the plunger.

9. Magnetic valve according to claim 8, wherein the decompressed damping spring has a length at most as long as the distance between said shoulder of the plunger and said end face of the armature when placed into the rest condition corresponding to the extreme end position, under the action of said closing spring generating the restoring force.

10. Magnetic valve according to claim 8, wherein the end of the tubular valve housing associated with said outlet at one end of the tubular valve housing open in the rest condition, is closed by a plug containing a valve seat.

11. Magnetic valve according to claim 10, wherein the end section of the tubular valve housing associated with said plug has a step-like shoulder, on which said coil of the electromagnet is mounted.

12. Magnetic valve according to claim 1, wherein said energizing of said coil of the electromagnet acts on the armature and holds the armature in an equilibrium position at that point where it has travelled the entire displacement distance of the plunger from its normal rest condition, plus approximately half the distance of relative movement between the armature and the plunger.

13. Magnetic valve according to claim 1, wherein each said opening at each end of the tubular valve housing is connected to a different choke capillary with each choke capillary connected to a different evaporator section of a compressor-operated circuit of a two-temperature refrigerator consisting substantially of an encapsulated motor-compressor unit, a condenser, a drier and two parallel-connected choke capillaries as well as two evaporator sections with the corresponding connecting lines, for the discharge of refrigeration fluid into said capillaries.

14. Magnetic valve according to claim 13, wherein said inlet in said tubular housing is connected to said drier for the introduction of refrigeration fluid into said axial bore hole in said tubular housing.

* * * * *